United States Patent
Guedon et al.

(10) Patent No.: US 12,415,748 B2
(45) Date of Patent: Sep. 16, 2025

(54) METHOD FOR MANUFACTURING A GLASS-CERAMIC ARTICLE

(71) Applicant: EUROKERA S.N.C., Chateau Thierry (FR)

(72) Inventors: Thibault Guedon, Paris (FR); Micheline Plichard, Fere en Tardenois (FR)

(73) Assignee: EUROKERA S.N.C., Chateau Thierry (FR)

( * ) Notice: Subject to any disclaimer, the term of this patent is extended or adjusted under 35 U.S.C. 154(b) by 439 days.

(21) Appl. No.: 17/786,985

(22) PCT Filed: Nov. 19, 2020

(86) PCT No.: PCT/EP2020/082649
§ 371 (c)(1),
(2) Date: Jun. 17, 2022

(87) PCT Pub. No.: WO2021/121846
PCT Pub. Date: Jun. 24, 2021

(65) Prior Publication Data
US 2023/0041565 A1    Feb. 9, 2023

(30) Foreign Application Priority Data
Dec. 19, 2019   (FR) ..................... 1914890

(51) Int. Cl.
*C03C 15/00* (2006.01)
*C03B 32/02* (2006.01)
(Continued)

(52) U.S. Cl.
CPC ............. *C03C 15/00* (2013.01); *C03B 32/02* (2013.01); *C03C 10/0027* (2013.01); *C03C 2204/08* (2013.01)

(58) Field of Classification Search
CPC ............... C03C 15/00; C03C 10/0027; C03C 10/00–0045; C03B 32/02; F24C 15/10
See application file for complete search history.

(56) References Cited

U.S. PATENT DOCUMENTS

| 6,299,940 B1 | 10/2001 | Rapp et al. |
| 2013/0286630 A1* | 10/2013 | Guiset ................. F24C 7/083 362/23.17 |

(Continued)

FOREIGN PATENT DOCUMENTS

| DE | 44 08 192 A1 | 1/1995 |
| EP | 2 532 629 A1 | 12/2012 |

(Continued)

OTHER PUBLICATIONS

JP 2007-170754 A (Ikegami) Jul. 5, 2007 (English language machine translation). [online] [retrieved Sep. 19, 2024]. Retrieved from: Espacenet. (Year: 2007).*

(Continued)

*Primary Examiner* — Erin Snelting
(74) *Attorney, Agent, or Firm* — Pillsbury Winthrop Shaw Pittman LLP

(57) ABSTRACT

A process for the manufacture of a glass-ceramic article exhibiting properties of resistance to scratches, greasy marks, adhesion of dirt and light scattering. The glass-ceramic article includes a surface, the surface arithmetic roughness of which is between 2 μm and 7 μm and the roughness being obtained using a chemical surface treatment. The glass-ceramic article is particularly suitable for use as a cooking surface and/or as surface for the preparation of foodstuffs.

10 Claims, 2 Drawing Sheets

(51) Int. Cl.
*C03C 10/00* (2006.01)
*C03C 10/12* (2006.01)

(56) References Cited

U.S. PATENT DOCUMENTS

| | | | | |
|---|---|---|---|---|
| 2015/0299034 | A1* | 10/2015 | Hou | C03C 15/00 |
| | | | | 428/141 |
| 2016/0251259 | A1* | 9/2016 | Bazemore | C03C 10/00 |
| | | | | 428/156 |
| 2018/0249824 | A1* | 9/2018 | Debreyer | A47B 96/18 |
| 2018/0286630 | A1 | 10/2018 | Takekoshi | |
| 2020/0317560 | A1* | 10/2020 | Lepcha | C03C 8/20 |

FOREIGN PATENT DOCUMENTS

| | | |
|---|---|---|
| JP | S61-270888 A | 12/1986 |
| JP | 2007-170754 A | 7/2007 |
| JP | 2014-503778 A | 2/2014 |
| JP | 2016-501810 A | 1/2016 |
| JP | 2018-511547 A | 4/2018 |
| JP | 2018-528911 A | 10/2018 |
| JP | 2019-508354 A | 3/2019 |
| WO | WO 2012/156444 A1 | 11/2012 |
| WO | WO 2013/190230 A1 | 12/2013 |
| WO | WO 2014/070869 A1 | 5/2014 |
| WO | WO 2016/138051 A1 | 9/2016 |
| WO | WO 2019/158881 A1 | 8/2019 |
| WO | WO 2019/158882 A1 | 8/2019 |

OTHER PUBLICATIONS

Notice of Reasons for Refusal as issued in Japanese Application No. 2022-537698, dated Aug. 27, 2024.
KR International Search Report as issued in International Patent Application No. PCT/EP2020/082649, dated Jan. 21, 2021.

* cited by examiner

METHOD FOR MANUFACTURING A GLASS-CERAMIC ARTICLE

CROSS-REFERENCE TO RELATED APPLICATIONS

This application is the U.S. National Stage of PCT/EP2020/082649, filed Nov. 19, 2020, which in turn claims priority to French patent application number 1914890 filed Dec. 19, 2019. The content of these applications are incorporated herein by reference in their entireties.

TECHNICAL FIELD

The invention relates to a process for the manufacture of a glass-ceramic article comprising a surface exhibiting properties of resistance to scratches, greasy marks, adhesion of dirt and light scattering. The glass-ceramic article is particularly suitable for use as a cooking surface and/or as surface for the preparation of foodstuffs.

TECHNICAL BACKGROUND

A glass-ceramic is a composite material comprising an amorphous phase in which crystalline phases or crystals are dispersed. It is generally obtained by the heat treatment of a glass capable of forming a glass-ceramic, called "mother glass", in order to crystallize, in a controlled manner, crystals in its volume. This treatment, by which a glass partially crystallizes, is called "ceramization treatment" or simply "ceramization". The final physicochemical properties of the glass-ceramic depend on the composition of the mother glass and on the ceramization treatment.

Glass-ceramics are appreciated in many fields for their esthetic qualities and their physicochemical properties, in particular their low coefficient of thermal expansion and their resistance to thermal shocks. They are particularly used in kitchen equipment, in particular in the form of a plate, for example as a cooking; surface in cooking devices, glass oven wall, and work surface in worktops, work tables or work units for the preparation of foodstuffs, in these applications, the glass-ceramics are generally based on lithium aluminosilicate.

Depending on their uses, the glass-ceramic articles can be provided with a number of accessories, such as controls, sensors and displays, which make possible interaction between the user and the devices in which these articles are incorporated.

By way of example, they can be provided with controls, such as touch-operated or optical keys, for actuating and controlling various electrical and/or electronic devices, such as heating and/or lighting means. They can also comprise displays, in particular light displays, for the projection, in particular in transmission, of cognitive light patterns (for example icons or numbers) representative of values of certain operating parameters of these devices (for example the heating power of a heating device), or also relating to the physicochemical state of the article (for example the signaling of a hot area).

They can also be equipped with optical and/or thermal sensors making it possible, for example, to detect elements on their surface, such as an overflowing liquid, or also to measure the surface temperature of the article, and to warn the user by sound signaling or visual signaling via a display area.

The interactions, in particular tactile, between the surface of the glass-ceramic article and the user, and the handling of liquid or solid food substances and of mechanical preparation instruments (for example knife blades), cause the appearance of various unsightly marks at the points of contact with the surface, in particular fingerprints. They can also cause soiling thereon, such as remains of dried or burnt foodstuffs on the surface of the article, or scratches.

These marks and soiling can lead to repeated cleaning actions by the user using abrasive products, which themselves can cause other scratches. These various problems are particularly significant on glass-ceramic articles comprising matt or glossy dark work surfaces.

In order to avoid fingerprints and soiling and to limit the appearance or the visibility of scratches, it is known to use various organic or inorganic and textured or nontextured coatings having hydrophobic or oleophobic properties.

Applications WO2019158881 A1 and WO2019158882 A1 describe an enamel of low roughness limiting the visibility of fingerprints.

Application WO2013190230 A1 describes a glass-ceramic article comprising a surface provided with a textured, in particular sol-gel, layer. The texture is formed by regular patterns, in particular geometric patterns, the height of which is between 2 and 100 µm.

Application U.S. Pat. No. 6,299,940 A1 describes a textured ceramic paint making it possible to limit the visibility of fingerprints and scratches.

Application JP2007170754. describes a glass-ceramic article comprising a work surface exhibiting a roughness of between 0.1 µm and 20 µm in order to confer light-scattering properties and a milky white appearance on it. This article is obtained using a combination of mechanical and chemical surface treatments.

Application WO2014070869A1 describes a method of manufacture by chemical attack of a glass-ceramic article making it possible to obtain a work surface with a roughness (RMS) of between 0.01 µm and 1 µm in order to reduce the gloss thereof.

SUMMARY OF THE INVENTION

Technical Problem

The technical solutions based on the use of an optionally textured coating exhibit several disadvantages. The coatings may be not very durable; in particular, they can deteriorate under the effect of the repeated thermal and mechanical stresses during the use of the glass-ceramic article. It is also often impossible, especially for enamel-based coatings, to treat the entire work surface of the glass-ceramic article, It has also been observed that the roughness of the textured surfaces, with or without the help of a coating, as described in the state of the art, makes possible the reduction in the visibility of fingerprints and scratches only to the detriment of the ability of the work surface to be easily cleaned, of the visibility of the light patterns transmitted by light splays and/or of the possibility of subsequent deposition of enamel by screen printing with esthetically sharp decorative or functional patterns.

In the case of glass-ceramic; articles exhibiting a matt work surface, the roughness of these textured surfaces can also cause fortuitous and untimely variations in gloss which are detrimental to their esthetic rendering.

Technical Solution

The present invention solves these problems. It relates to a process for the manufacture of a glass-ceramic article as described in claim 1, and to a glass-ceramic article obtained by such a process, the dependent claims being advantageous embodiments, It has been found, surprisingly, that a specific roughness made it possible to confer, on the surface of a glass-ceramic article, at the same time properties of resistance to scratches, greasy marks, adhesion of dirt and light scattering, without detrimentally affecting the esthetic rendering of matt surfaces by unexpected variations in gloss.

It is important to note that the roughness of the surface of the glass-ceramic article is obtained without addition of a surface coating; in other words, the rough surface is intrinsic to the glass-ceramic article.

It is also important to note that the roughness is obtained using a chemical surface treatment. This is because it has been found, quite surprisingly, that, for equivalent roughness values, a roughness obtained by other surface treatment methods, in particular mechanical methods, such as, for example, sandblasting, did not make it possible to obtain the effects and advantages described above. One possible explanation, which, however, remains only a hypothesis, is that the relief forming a roughness obtained by a chemical surface treatment may be less protruding than the relief forming a roughness obtained by a mechanical surface treatment. In general, the roughness obtained with the aid of a chemical surface treatment is irregular, that is to say that it is not formed of regular and/or geometric patterns.

Technical Advantages

The present invention thus provides several advantages in comparison with the solutions of the state of the art based on the use of an organic or inorganic and textured or nontextured coating.

The risk of degradation/delamination, in particular in hot areas, is eliminated since no coating is used. Implementation is furthermore facilitated since, unlike enamel screen printing, it is possible to confer a roughness on the glass-ceramic article over its entire work surface.

Moreover, in comparison with the solutions of the state of the art based on the use or not of a coating, this specific roughness, which is intrinsic to or inherent in the surface of the glass-ceramic article, does not detrimentally affect the thermal and mechanical properties of said surface.

It also makes possible easy cleaning of any soiling. It makes possible the subsequent sharp and precise deposition by screen printing of a decorative or functional coating, such as an enamel or a luster, on the rough surface. It preserves the esthetic rendering of matt surfaces, by minimizing the variations in gloss, Finally, the light patterns transmitted by the light displays on the rough surface remain sharp for better visibility comfort for the user.

BRIEF DESCRIPTION OF THE FIGURES

The change in the mean value of the degree of visibility of the scratches on the rough surface of a glass-ceramic article as a function of the value of the arithmetic roughness of said surface is represented in FIG. 1.

The change in the mean of the degrees of visibility of at least five prints on the rough surface of a glass-ceramic article as a function of the value of the arithmetic roughness of said surface is represented in FIG. 2.

Figure 3:
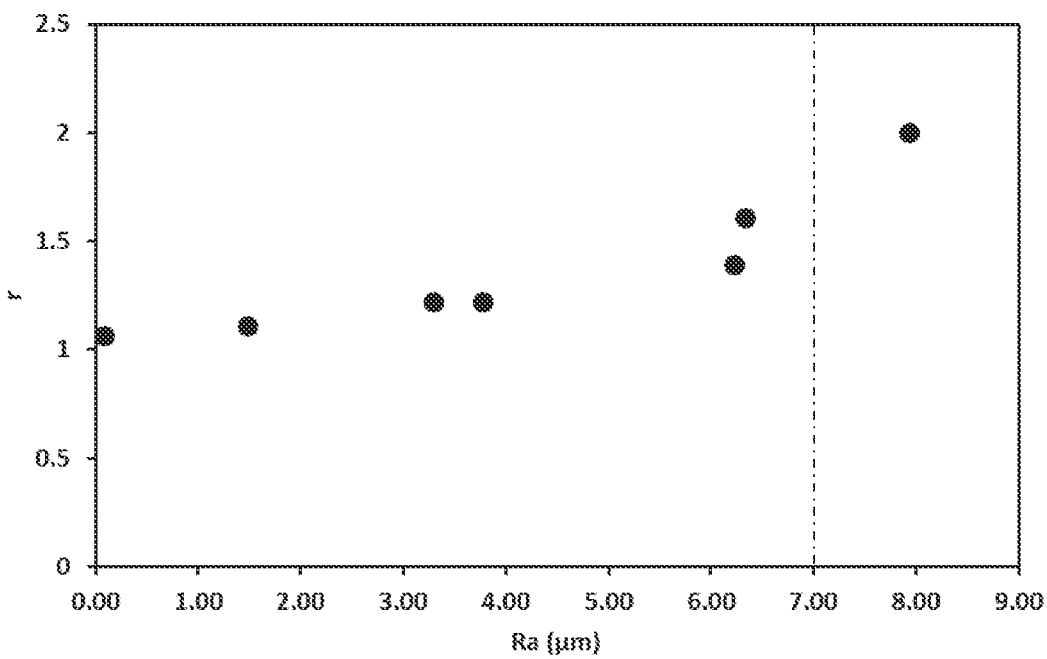

The change in the resolution of an enameled decorative line on the rough surface of a glass-ceramic article as a function of the value of the arithmetic roughness of said surface is represented in FIG. 3.

Figure 4:
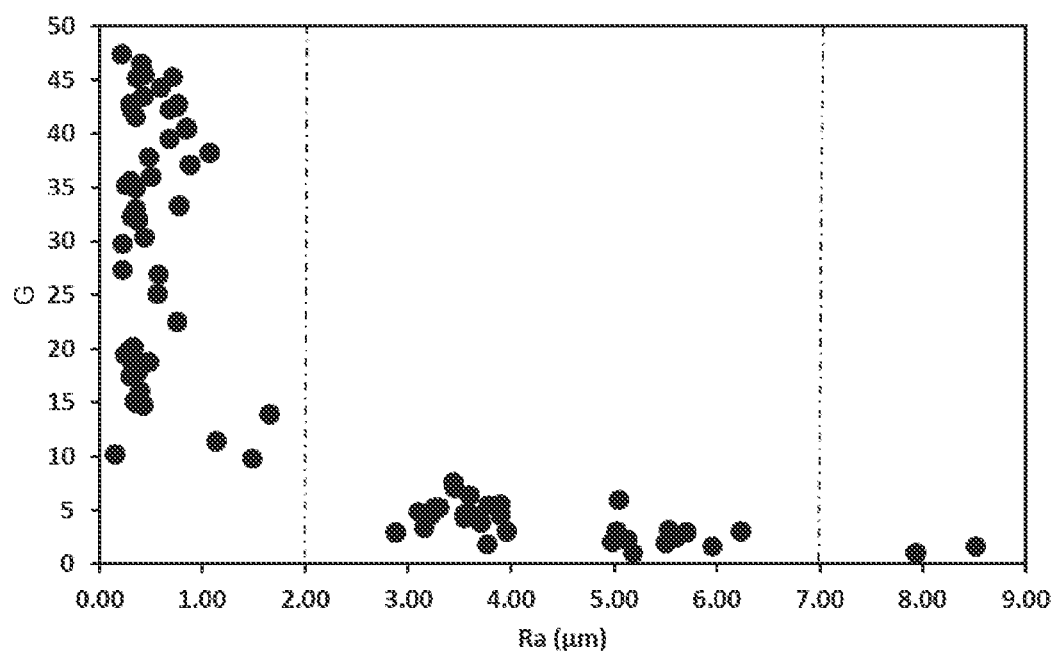

The change in the gloss measured at 60° of the rough surface of a glass-ceramic article as a function of the value of the arithmetic roughness of said surface is represented in FIG. 4.

DESCRIPTION OF CERTAIN EMBODIMENTS

In the context of the account of the invention, reference is made to the following definitions and conventions.

Arithmetic roughness, denoted $R_a$, is understood to mean the arithmetic mean of the deviation of a surface profile, as defined in the standard ISO 4287.

Total peak-valley roughness, denoted $R_t$, is understood to mean the difference between the maximum in height and the maximum in depth of a surface profile, as defined in the standard ISO 4287.

Intrinsic or inherent roughness of a surface of a glass-ceramic article is understood to mean the roughness of the glass-ceramic material of the article itself, devoid of any surface coating.

Glass-ceramic article is understood to mean a composite material, preferably based of aluminosilicate, in particular based on lithium silicate, comprising an amorphous phase in which crystalline phases or crystals are dispersed. It is obtained by the heat treatment of a glass capable of forming a glass-ceramic, called "mother glass", in order to crystallize, in a controlled manner, crystals in its volume.

Gloss is understood to mean the gloss measured at 60° as defined in the standard ISO 2813. It is generally expressed in gloss units, denoted GU.

The manufacturing process according to the invention comprises the following stages:
  a ceramization heat treatment of a glass capable of forming a glass-ceramic, and
  a chemical treatment of a surface of said glass before and/or after said ceramization heat treatment,
  the chemical surface treatment being carried out so that, after the heat treatment, the arithmetic roughness of said surface is between 2 μm and 7 μm, preferably greater than 2 μm and less than 6 μm, indeed even between 3 μm and 6 μm, in particular between 3 μm and 5 μm.

The chemical surface treatment can be carried out before and/or after the ceramization heat treatment,
  In a first embodiment, the process comprises:
  a ceramization heat treatment of a glass capable of forming a glass-ceramic, and
  a chemical treatment of a surface of said glass before said ceramization heat treatment,
  the chemical surface treatment being carried out so that, after the heat treatment, the arithmetic roughness of said surface is between 2 μm and 7 μm, preferably greater than 2 μm and less than 6 μm, indeed even between 3 μm and 6 μm, in particular between 3 μm and 5 μm.
  In a second preferred embodiment, the process comprises:
  a ceramization heat treatment of a glass capable of forming a glass-ceramic, and
  a chemical treatment of a surface of said glass after said ceramization heat treatment,
  the chemical surface treatment being carried out so that, after the heat treatment, the arithmetic roughness of said surface is between 2 μm and 7 μm, preferably greater than 2 μm and less than 6 μm, indeed even between 3 μm and 6 μm, in particular between 3 μm and 5 μm.

In a third embodiment, the process comprises:
  a ceramization heat treatment of a glass capable of forming a glass-ceramic, and
  a chemical treatment of a surface of said glass before and after said ceramization heat treatment,
the chemical surface treatment being carried out so that, after the heat treatment, the arithmetic roughness of said surface is between 2 µm and 7 m, preferably greater than 2 µm and less than 6 µm, indeed even between 3 µm and 6 µm, in particular between 3 µm and 5 µm.

In one each of these three embodiments, the chemical surface treatment is carried out so that, after the heat treatment, the arithmetic roughness of said surface is between 2 µm and 7 µm, preferably greater than 2 µm and less than 6 µm, indeed even between 3 µm and 6 µm, in particular between 3 µm and 5 µm. In other words, the arithmetic roughness corresponds to that of the surface of the glass-ceramic, and not to that of the glass, whether the chemical treatment has taken place before, after or before and after the heat treatment.

In the second preferred embodiment, the chemical surface treatment of the glass is carried out before the ceramization heat treatment. It has been found that the properties of resistance to scratches, greasy marks, adhesion of dirt and light scattering were thus further improved.

In this embodiment, the roughness is thus obtained by means of a chemical surface treatment of the mother glass of the glass-ceramic article, that is to say before the ceramization heat treatment of the mother glass making it possible to form the glass-ceramic article. The roughness values are those of the rough surface of the glass-ceramic article after the ceramization treatment.

In one embodiment, the chemical treatment is carried out so that, after the ceramization heat treatment, the total peak-valley roughness of said surface is between 10 µm and 60 µm, preferably 10 µm and 50 µm, indeed even between 20 µm and 50 µm, in particular between 20 µm and 40 µm. The ability of the rough surface to be cleaned is then further improved, and subsequent deposition of enamel by screen printing with esthetically sharp decorative or functional patterns is further facilitated.

The glass capable of forming a glass-ceramic is preferably based on aluminosilicate, in particular on lithium aluminosilicate. It has been found that such a glass is particularly suitable for forming a glass-ceramic article exhibiting a surface, the arithmetic surface roughness of which is greater than 2 u m and less than 7 µm, preferably between 3 µm and 6 µm, in particular between 3 µm and 5 µm, and said roughness being obtained by means of a chemical treatment of the surface of the mother glass.

The nature of the chemical solution used for the treatment, the treatment temperature and the treatment duration depend on the nature of the material forming the mother glass of the glass-ceramic article.

As set out above, one advantage of the invention is a facilitated implementation since, unlike enamel screen printing, it is possible to confer a roughness on the glass-ceramic article over its entire work surface. It is also possible to confer a roughness only on a part of the work surface of the glass-ceramic article. This characteristic can be obtained, for example, by affixing protective masks to the surface of the mother glass during the chemical surface treatment so as to create resists on certain areas of said surface.

In one embodiment, the chemical surface treatment is a chemical attack using an acid solution, preferably based on hydrofluoric acid. This embodiment is particularly advantageous for glass-ceramic articles based on aluminosilicate, in particular on lithium aluminosilicate.

The content by weight of hydrofluoric acid of the acid solution can advantageously be between 1% and 20% by weight. Generally, if the content by weight is less than 1%, the duration of the chemical surface treatment is quite long and not very advantageous in industrial applications. If the content by weight is greater than 20%, the chemical surface treatment may be too rapid and difficult to control. The temperature of the solution is preferably less than 40° C., indeed even 30° C., in order to prevent the chemical surface treatment from also being too rapid and difficult to control.

Another advantage of the invention is that it makes possible the subsequent sharp and precise deposition by screen printing of a decorative or functional coating, such as an enamel or a luster, on the rough surface of the glass-ceramic article. In this sense, the process can additionally comprise, before and/or after the stage of ceramization heat treatment, a stage of screen printing on at least an area of the surface of the mother glass on which the chemical surface treatment is carried out. This screen printing area can, for example, comprise a mineral enamel, an organic and/or inorganic paint or a luster.

Screen printing is understood to mean any functional and/or decorative and organic and/or mineral coating deposited by a screen printing method, involving in particular the use of a suitable screen, especially a textile screen, for the deposition of the coating on the work surface. It is also possible to deposit the coating using a non-contact digital printing method, such as mineral inkjet printing, which is particularly suitable for the enameling of complex decorations on a glass-ceramic support.

One advantage of the invention is to preserve the esthetic rendering of matt surfaces. In particular, the gloss, measured at 60°, of the surface of a glass-ceramic article obtained using the process of the invention is between 1.5 GU and 10 GU, in particular between 2 GU and 10 GU. It has been found that a gloss value outside this range damages the esthetic appearance of matt surfaces. Beyond 10 GU, the surface becomes too glossy and below it becomes too matt for the visual comfort of the users.

The present invention also relates to a glass-ceramic article capable of being obtained using a process for the manufacture of a glass-ceramic article as described above.

The effects and advantages of the invention are particularly marked when the glass-ceramic article is weakly transmissive, not very scattering and dark in color (defined by the lightness L*), in particular black or dark brown in color. The glass-ceramic article nevertheless remains suitable for the display in transmission of a light zone comprising cognitive light patterns representative of values of certain operating parameters of associated electrical and/or electronic devices, or also relating to the physicochemical state of the article, while masking the underlying elements.

In this sense, in a specific embodiment of tie invention, the glass-ceramic article exhibits a lightness L* of less than 30, preferably less than 25. indeed even 20.

A dark-colored glass-ceramic article preferentially exhibits an opacity factor of less than 100, and advantageously of greater than 93, in order in particular to make possible said display in transmission by underlying sources in one embodiment of the invention or a display by projection. The opacity factor is determined by the formula $f=100-\Delta E^*$ and is evaluated by measuring (reflection colorimetry carried out using a Byk-Gardner Color Guide 45/0 colorimeter) the color variation $\Delta E^*$, corresponding to the difference between the color, measured in reflection on the upper face of the substrate, for the substrate placed on an opaque black background and the color for the substrate placed on an opaque white background. ($\Delta E^* = ((L_B^* - L_W^*)^2 + (a_B^* - a_W^*)^2 + (b_B^* - b_W^*)^2)^{1/2}$, $L_W^*$, $a_W^*$ and being the colorimetric coordinates of the first measurement on a white background and $L_B^*$, $a_B^*$ and $b_B^*$ being those of the second measurement on a black background in the calorimetric system established in 1976 by the CIE).

A black-colored glass-ceramic article generally exhibits a lightness L* of less than 10, a blurring of less than 30% and a light transmission $T_L$ (D65) of less than 10%. $T_L$ (D65) is calculated from the optical transmission spectrum according to the standard ISO 9050:2003 and the illuminant D65.

Preferably, the dark-colored glass-ceramic article exhibits a parameter a* value of between 0 and 0.4 and a parameter b* value of between −1 and 0.5.

The invention also advantageously makes it possible for ne light patterns transmitted by light displays on the rough surface to remain sharp for better visibility comfort for the user. Consequently, the glass-ceramic article according to the invention can additionally comprise at least one light source for light display by projection or transmission on the surface then forming a screen. The display can, for example, be a light display of LED type, in particular a seven-segment display for displaying alphanumeric characters.

The work surface of the glass-ceramic article according to the invention has properties of resistance to scratches, greasy marks, adhesion of dirt and light scattering. The invention is particularly suitable for glass-ceramic articles in the form of a glass-ceramic plate. Consequently, the invention also relates to a cooking device comprising a glass-ceramic plate formed by a glass-ceramic article according to any one of the embodiments described. As heating elements, the device can comprise, for example, radiant or halogen heat sources or induction heating elements.

The invention also relates to the use of a glass-ceramic article according to any one of the embodiments described as all or part of a worktop for the preparation of foods. The worktop can, for example, form part of an element of kitchen furniture or as surface element of a cooking device, said surface element having the function of making possible the preparation of foods.

The characteristics and advantages of the invention are now illustrated by the examples described below.

Several examples of glass-ceramic articles have been manufactured in accordance with the invention while others have not been, in order to serve as counterexamples for illustrating the effects and advantages of the invention.

In these examples and counterexamples, the articles are mother glass plates of glass-ceramic plates as described in the patent application WO2012156444 and sold under the KeraBlack® brand. The thickness of the plates is 6 mm, The roughnesses were obtained by means of a chemical treatment of the surface of the mother glasses of the plates before the ceramization heat treatment, in this case using a solution based on hydrofluoric acid.

In order to obtain different roughness values, the work surfaces of the plates (that is to say, the surfaces intended to be used as cooking surfaces in cooking devices) were subjected to solutions of hydrofluoric acid and of ammonium fluoride of different pH values at different temperatures and different durations. The content by weight of hydrofluoric acid in the acid solutions used is between 1% and 20% by weight. Their temperature is below 40° C.

The roughness values were measured using a Mitutoyo SJ401 mechanical tracer according to the standard ISO 4287 over an evaluation length of 4 mm.

Each example and counterexample was subjected to different tests of evaluation of the properties of resistance to scratches, greasy marks, adhesion of dirt and light scattering.

The property of resistance to scratches was evaluated using the following protocol. The rough surface of the article is placed under a P240 abrasive disk made of silicon carbide with a pressure of approximately 5 N/cm². The disk is subsequently displaced once in this state over a distance of approximately 4 to 5 cm. The rough surface of the glass-ceramic article is subsequently placed under white illumination with a power of 300-400 lux, and then observed under an angle of observation of approximately 60°. The visibility of the scratches is evaluated according to the following scale of degrees:

1: scratches highly visible;
2: scratches visible:
3: scratches barely visible:
4: no visible scratches.

Figure 1:
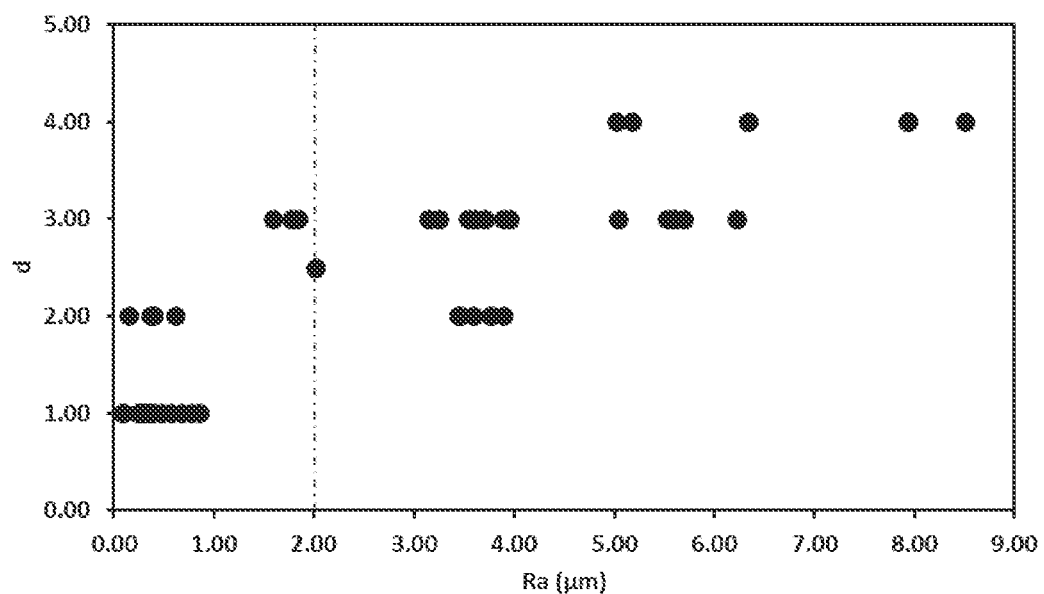

The results obtained for the examples and counterexamples are represented in the graph of FIG. 1. This graph represents the change in the mean value of the degree, d, of visibility of the scratches as a function of the value of the arithmetic roughness of the rough surface of said article.

FIG. 1 clearly shows that, when the surface arithmetic roughness, Ra, is less than or equal to 1, the majority of the glass-ceramic articles exhibit a mean far below 3, that is to say that the scratches are visible or highly visible. On the other hand, when the arithmetic roughness, Ra, is greater than 2 μm, all the glass-ceramic articles exhibit a mean of degrees of visibility of 3 to 4, that is to say that the scratches are barely or not visible.

The property of resistance to greasy marks was evaluated using the following protocol. The rough surface of the glass-ceramic article is felt with bare fingers so as to produce fingerprints. The surface is subsequently placed under white illumination with a power of 300-400 lux, and then observed under an angle of observation of approximately 60°. The visibility of the greasy marks, in particular of the finger marks, is evaluated according to the following scale of degrees:

0 print not visible;
1 print visible by observing persistently;
2 print visible but a few seconds of observation;
3 print visible immediately;
4 print as visible as a reference mark;
5 print more visible than a reference mark.

The visibility of at least five finger marks is evaluated and then a mean value is calculated. It is considered that a work surface of a glass-ceramic article exhibits an esthetically satisfactory property of resistance to greasy marks when this mean is less than 1.

Figure 2:
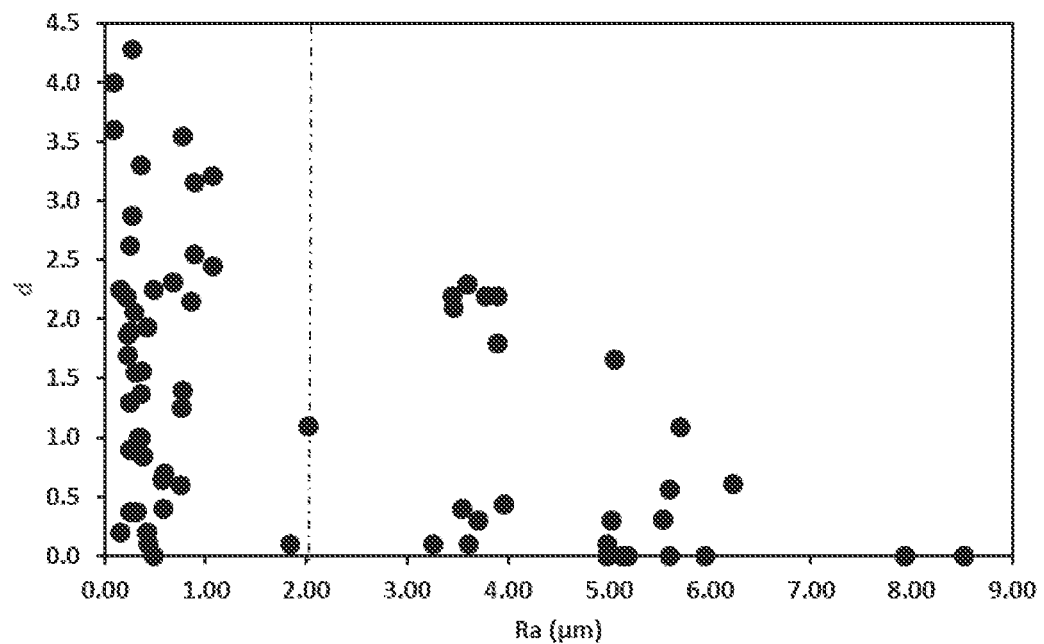

The results obtained for the examples and counterexamples are represented in the graph of FIG. 2. This graph represents the change in the mean of the degrees, d, of visibility of at least five prints as a function of the value of the arithmetic roughness of the work surface of said article.

FIG. 2 clearly shows that, when the surface arithmetic roughness, Pa, is less than or equal to 2, their mean of the degrees of visibility is highly variable and the majority of the glass-ceramic articles exhibit a mean much greater than 1.5. On the other hand, when the arithmetic roughness, Ra, is greater than 2, all the glass-ceramic articles exhibit a mean of degrees of visibility of less than 2.5, indeed even than 1.5 or 1.

The property of resistance to adhesion of dirt was evaluated using the following protocol. The glass-ceramic article is first of all inserted on a cooking device in which its work surface serves as cooking surface, A saucepan containing cereals or meat is placed on the work surface of the article, then heated to maximum power, then kept in this state for 3 to 4 minutes. This operation is repeated approximately 5 to 10 times, successively using a saucepan containing cereals or meat. The degree of soiling is evaluated by the ability of the surface to be cleaned manually with a scraper and using a detergent specially designed for cleaning cooktops and available commercially, for example the detergent sold under the VitroClen® brand. It was found that the glass-ceramic articles exhibiting a rough surface, the arithmetic roughness value of which was greater than 6 µm, could not be cleaned. On the other hand, those the work surface of which exhibits an arithmetic roughness of between 2 µm and 6 µm, and particularly between 3 µm and 5 µm, could be easily cleaned.

The property of resistance to light scattering was evaluated using the following protocol. Light displays of LED type having 7 segments with a light power of 1600 Cd/m$^2$ are placed under the glass-ceramic article so that their light is transmitted through the article and the display is produced on the work surface. The blurring effect is evaluated visually.

During this evaluation, it was found that all the glass-ceramic articles, the work surface of which had an arithmetic The results obtained for the examples and counterexamples are represented in the graph of FIG. 3. The change in the resolution, r, of a line of enameled decoration on the work surface as a function of the value of the arithmetic roughness of said surface is represented in this graph.

The graph of FIG. 3 clearly shows that an esthetically very satisfactory resolution is obtained when the arithmetic roughness, Ra, is less than or equal to 7 µm, indeed even less than 6 µm.

The gloss was measured at 60" in accordance with the standard ISO 2813 using a Spectro-Guide spectrometer from the company Byk Gardner. The results obtained for the work surfaces of the examples and counterexamples are represented in FIG. 4. The change in the gloss, expressed in GU, of the work surface as a function of the value of the arithmetic roughness of said surface is represented in the graph.

The graph of FIG. 4 clearly shows that the gloss is between 1.5 GU and 10 GU, predominantly between 2 GU and 10 GU when the roughness is between 2 µm and 7 µm.

The results of a number of examples and counterexamples are combined in table 1 below. The values of the roughness parameters Rz, Rq, Rt, Rp and Rv as defined in the standard are also shown in this table,

TABLE 1

| | Ra (µm) | Rz (µm) | Rq (µm) | Rt (µm) | Rp (µm) | Rv (µm) | G (GU) | d marks) (greasy | d (scratches) |
|---|---|---|---|---|---|---|---|---|---|
| | | | | Examples | | | | | |
| Ex. 1 | 3.89 | 23.63 | 4.94 | 30.92. | 9.20 | 14.40 | 4.65 | 2,20 | 3.00 |
| Ex. 2 | 3.59 | 22.70 | 4.65 | 28.20 | 9.17 | 13.60 | 6.40 | 2.30 | 2.00 |
| Ex. 3 | 3.77 | 23.31 | 4.80 | 29.95 | 9.48 | 13.82 | 5.52 | 2.20 | 2.00 |
| Ex. 4 | 3.89 | 24.76 | 5.02 | 32.10 | 9.68 | 15.09 | 5.60 | 1.80 | 2.00 |
| Ex. 5 | 3.45 | 20.97 | 4.42 | 29.17 | 8.47 | 12.52 | 7.10 | 2.10 | 2.00 |
| Ex. 6 | 3.44 | 20.47 | 4.36 | 28.53 | 8.33 | 12.10 | 7.60 | 2.20 | 2.00 |
| Ex. 7 | 3.70 | 23.28 | 4.70 | 29.12 | 9.48 | 13.81 | 3.93 | 0.30 | 3.00 |
| Ex. 8 | 5.05 | 29.13 | 6.43 | 40.25 | 12.17 | 16.95 | 6.00 | 1.66 | 3.00 |
| Ex. 9 | 5.70 | 35.09 | 7.29 | 44.53 | 14.25 | 20.85 | 3.00 | 1.10 | 3.00 |
| Ex. 10 | 6.22 | 37.51 | 7.90 | 50.57 | 15.72 | 21.80 | 3.10 | 0.61 | 3.00 |
| | | | | Counterexamples | | | | | |
| Cex. 1 | 7.93 | — | — | 48.70 | — | — | 1.10 | 0.00 | 4.00 |
| Cex. 2 | 8.51 | — | — | 53.80 | — | — | 1.70 | 0.00 | 4.00 |
| Cex. 3 | 0.27 | — | — | 2.50 | — | — | 57.70 | 4.28 | 1.00 |
| Cex. 4 | 0.88 | — | — | 7.30 | — | — | 37.20 | 3.15 | — | roughness of greater than 6 µm, exhibited a blurring level unacceptable for the display in transmission of light patterns by inserted light displays, The possibility of subsequent deposition of enamel by screen printing with esthetically sharp decorative or functional patterns on the rough surface of the glass-ceramic articles was evaluated by measuring the resolution of a line of enameled decoration. To this end, an enamel line with a thickness of 6 µm is first deposited by screen printing and then, after drying and firing of the enamel (the thickness of the line after firing is 3 µm), the length of the enameled area/nonenameled area border is measured using an optical microscope. Subsequently, the ratio of this measured length to the theoretical length of this same border if it were perfectly rectilinear is calculated. This ratio, denoted r, corresponds to the resolution of the line of enameled decoration. Resolution is regarded as esthetically acceptable when this value is less than 1.6, preferably less than 1.5.

Another example of a glass-ceramic article was manufactured in accordance with the invention. For this example, a chemical surface treatment was carried out using an acid solution based on hydrofluoric acid applied directly to the surface of a glass-ceramic plate, that is to say a plate having already undergone a ceramization heat treatment, such as a plate described in WO2012156444 and sold under the KeraBlack+® brand. The thickness of the plate is 6 mm.

The roughness of the plate was characterized using a Mitutoyo SJ401 mechanical tracer according to the standard ISO 4287 over an evaluation length of 4 mm. Its arithmetic roughness, Ra, is 2.02 µm and its total peak-valley roughness, Rt, is 16 µm.

This plate was subsequently subjected to the same tests of evaluation of the properties of resistance to scratches, greasy marks, adhesion of t and light scattering as those described above.

The mean value of the degree, d, of visibility of the scratches is greater than 3. The mean of the degrees, d, of visibility of at least five fingerprints is less than 1. The resolution of the line of enameled decoration is less than 1.5. The plate can also be easily cleaned and exhibit little blurring when it is used with a light display of LED type having 7 segments with a light power of 1600 Cd/m$^2$ are placed under it.

These examples and counterexamples clearly show that a glass-ceramic article in accordance with the invention exhibits a rough surface having at the same time properties of resistance to scratches, greasy marks, adhesion of dirt and light scattering, and making it possible to preserve the esthetic rendering of matt surfaces.

The invention claimed is:

1. A process for the manufacture of a glass-ceramic article, said process comprising:
   a ceramization heat treatment of a glass capable of forming a glass-ceramic, and
   a chemical treatment of a surface of said glass before and/or after said ceramization heat treatment to form a textured surface,
   the chemical surface treatment being carried out so that, after the ceramization heat treatment, an arithmetic roughness of said textured surface is between 2 μm and 7 μm and the glass-ceramic article exhibits a lightness L* of less than 30,
   wherein the glass-ceramic article exhibits a gloss at 60° of between 1.5 GU and 10 GU.

2. The process as claimed in claim 1, wherein, in addition, the chemical surface treatment is carried out so that, after the ceramization heat treatment, a total peak-valley roughness of said surface is between 10 μm and 60 μm.

3. The process as claimed in claim 2, wherein the total peak-valley roughness of said surface is between 20 μm and 50 μm.

4. The process as claimed in claim 1, wherein the glass is based on aluminosilicate.

5. The process as claimed in claim 4, wherein the glass is based on lithium aluminosilicate.

6. The process as claimed in claim 1, wherein the chemical surface treatment is a chemical attack using an acid solution.

7. The process as claimed in claim 6, wherein the acid solution is based on hydrofluoric acid.

8. The process as claimed in claim 1, further comprising, before and/or after the ceramization heat treatment, a stage of screen printing on at least one area of said surface.

9. The process as claimed in claim 1, wherein the arithmetic roughness of said surface is between 2 μm and 6 μm.

10. The process as claimed in claim 9, wherein the arithmetic roughness of said surface is between 3 μm and 5 μm.

* * * * *